C. WAGNER & A. HORMEL.
LITHOGRAPHIC PRESS.
APPLICATION FILED MAR. 14, 1914.

1,120,771.

Patented Dec. 15, 1914.
7 SHEETS—SHEET 5.

C. WAGNER & A. HORMEL.
LITHOGRAPHIC PRESS.
APPLICATION FILED MAR. 14, 1914.

1,120,771.

Patented Dec. 15, 1914.
7 SHEETS—SHEET 6.

Witnesses:

Inventors
Charles Wagner
and August Hormel
By their Attorneys
Briesen & Knauth

UNITED STATES PATENT OFFICE.

CHARLES WAGNER, OF GRANTWOOD, NEW JERSEY, AND AUGUST HORMEL, OF NEW YORK, N. Y.

LITHOGRAPHIC PRESS.

1,120,771.      Specification of Letters Patent.      Patented Dec. 15, 1914.

Application filed March 14, 1914. Serial No. 824,615.

*To all whom it may concern:*

Be it known that we, CHARLES WAGNER, a citizen of the United States, residing at Grantwood, county of Bergen, and State of New Jersey, and AUGUST HORMEL, a citizen of the United States, residing at New York city, county and State of New York, have invented certain new and useful Improvements in Lithographic Presses, of which the following is a specification.

This invention relates to a lithographic press of novel construction by means of which both sides of the sheet or web to be printed, may be simultaneously provided with the desired imprints, the machine being more particularly designed for producing sheet music although it may obviously be used for printing other matter. The press is so constructed that the printing is effected on a continuous web, from which the printed portions are subsequently severed, said portions being then automatically folded in such a manner as to effectively prevent any blurring of the fresh ink.

The invention further comprises simple and reliable means for feeding the web, and for actuating the cutting and folding mechanism, as well as other novel features more fully brought out in the appended specification and claims.

In the accompanying drawings: Figure 1 is a side elevation of a lithographic press embodying our invention, Fig. 2 a vertical section of our printing press, on line 2—2, Fig. 4, Fig. 3 a vertical section on line 3—3, Fig. 4, Fig. 4 a vertical section on line 4—4, Fig. 3, Fig. 5 a sectional side elevation of the inking and dampening means, Fig. 6 an axial section through the reciprocating ink distributing roller and coöperating parts, Fig. 7 a face view partly in section of the web-cutting device, Fig. 8 a cross section on line 8—8, Fig. 7, Fig. 9 an end view of Fig. 7, Fig. 10 a face view partly in section of the sheet-folding device, Fig. 11 a cross section on line 11—11, Fig. 10, Fig. 12 a cross section, partly in view, on line 12—12, Fig. 10, and Fig. 13 an end view of Fig. 10.

Our improved lithographic press comprises essentially a lower printing roller 15 and an upper printing roller 16 between which the web or sheet to be printed is passed so as to be simultaneously provided with imprints on both of its sides. Roller 15 is provided with gudgeons 17 journaled in a pair of opposed bearing blocks 18 which are vertically adjustable in corresponding guide ways of the machine frame 20, said adjusting means comprising a pair of lower set screws 21 and a pair of upper springs 22. Roller 15 is surrounded by a rubber blanket 23, the overlapping ends of which are drawn, by a wedge 24, into a longitudinal surface groove 25 of said cylinder, and are firmly clamped against the tapering sides of said groove by tightening screws 26 that serve to hold the wedge to the cylinder. The gudgeons 27 of the upper printing roller 16 are likewise mounted in slide blocks 28, springs 29 tending to lift roller 16 off roller 15. For forcing roller 16 toward roller 15 a horizontal spindle 30 having handle 31, is arranged vertically above roller 16, which spindle carries at its ends a pair of eccentric studs 32 connected to blocks 28 by adjustable links 33. Rollers 15, 16 are mutually intergeared at both of their ends by gear wheels 34, 35 respectively, the gear wheel 34 receiving rotary motion from a power shaft 36 by toothed wheels 37 and toothed idlers 38. Roller 16 is surrounded by a rubber blanket 39 which is clamped thereto in precisely the same manner as described with reference to blanket 23.

The means for transferring the design, printed or other matter to be reproduced to blankets 23, 39, are substantially identical for both blankets, so that the description of said transferring means for one blanket likewise applies to the other blanket.

Blanket 39 is engaged by a lithographic sheet 40 stretched around a pattern roller 41 and clamped thereto by a pair of eccentrics 42, roller 41 being provided with gear wheels 43 that mesh into the gear wheels 35 of cylinder 16. The gudgeons 44 of roller 41 are journaled in slide blocks 45 guided in corresponding ways 46 of inclined arms 48 projecting laterally from blocks 28. Springs 49 tend to move roller 41 away from roller 16, while the former may be forced toward the latter in order to cause an engagement between the blanket 39 and the lithographic sheet 40, by means of a spindle 47 carrying a handle 50 and connected by eccentric studs 51 and adjustable links 52 to blocks 45.

The lithographic sheet 40 is shown to be permanently engaged by a pair of inking rollers 53 and a pair of dampening rollers 54 which alternately receive the ink and moisture from an ink supply roller 55 and a water supply roller 56. Roller 55 may be supplied with ink in any suitable manner, the drawing showing it in engagement with an ink receptacle 57, while the moisture supply roller 56 dips into a water tray 58. Rollers 55, 56 are alternately engaged by the transfer rollers 59, 60 respectively, the axles 61, 62 of which are journaled in swinging two-arm levers 63 fulcrumed at 64. Axles 61, 62 carry sprocket wheels 65 which are mutually connected by a chain 66.

Figure 5:
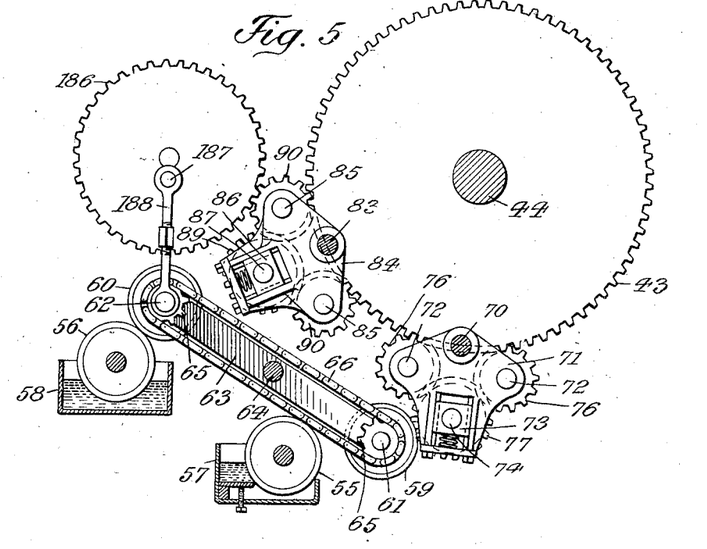
Figure 6:
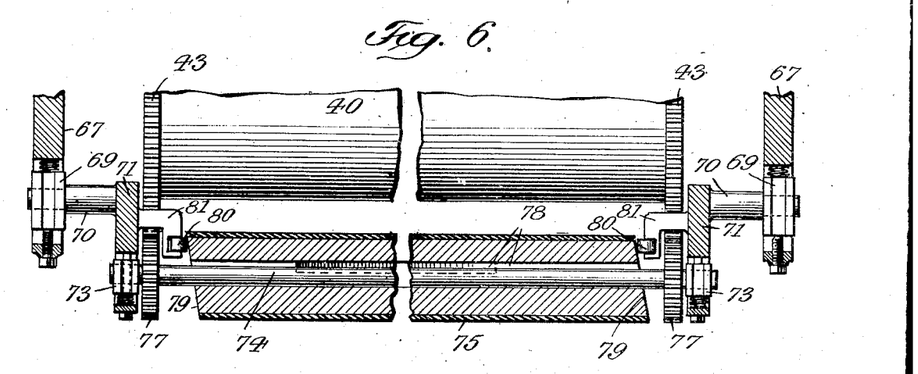

In order to properly support the inking rollers 53 and the dampening rollers 54 and to cause them to remain in contact with the lithographic sheet, while roller 41 is moved toward or away from rollers 16, the following construction has been devised: Each slide block 45 is provided with a substantially Y-shaped extension, one shank 67 of which supports the inking rollers, while its other shank 68 supports the dampening rollers. Along suitable ways of shank 67 is guided a spring-influenced adjustable bearing block 69 within which is journaled the stud 70 of a bearing-plate 71. In the latter are rotatably mounted the gudgeons 72 of the inking rollers 53, while within a spring-influenced slide block 73 engaging a corresponding guide way of plate 71, is journaled the spindle 74, of an ink-distributing roller 75. Gudgeons 72 carry pinions 76 that engage the toothed wheels 43, while the spindle 74 is provided with relatively fixed pinions 77 that mesh into pinions 76. Ink-distributing roller 75 is slidably and non-rotatably mounted upon the spindle 74 by means of a suitable groove and feather connection 78. The ends of roller 75 are formed by parallel planes 79 that extend obliquely to the axis of said roller. These roller-ends are engaged by a pair of wheels 80 hung in arms 81 that extend inwardly from plates 71. It will be seen that the wheels 80 will impart a reciprocating movement to the roller 75 during its revolution, thereby effecting a thorough distribution of the ink.

For supporting the dampening rollers 54, the shank 68 of each slide block 45 is provided with suitable ways for the engagement with a spring-influenced adjustable bearing 82. Within the latter is journaled the stud 83 of a bearing plate 84 that rotatably supports the gudgeons 85 of the rollers 54, while suitable guide ways of said plate are engaged by a spring-influenced slide block 86. Within this block is rotatably mounted the spindle 87 of a moisture-distributing roller 88, which is, by pinion 89, intergeared with the pinions 90 of rollers 54, the latter pinions in turn meshing into toothed wheel 43.

In order to slowly oscillate the levers 63 that carry the ink-transfer roller 59 and the moisture transfer roller 60, a toothed wheel 186 is shown to be intergeared with one of the pinions 90. Wheel 186 is provided with a wrist pin 187 which is operatively connected to axle 62 by an adjustable link 188. As thus far described, it will be seen that owing to the continuous rotation imparted to wheel 186, levers 63 will be oscillated. At one terminal position of the levers, roller 59 is in contact with distributing roller 75 to transfer its ink thereto, while roller 60 is in contact with roller 56 to take up a fresh supply of moisture, rotary motion being transmitted from roller 59 to roller 60 through chain 66. At the other terminal position of levers 63, roller 60 is in contact with roller 88 to transfer its moisture to this roller, while roller 59 engages roller 55 to take up a fresh supply of ink, roller 59 being now driven from roller 60 through chain 66. It will thus be seen that by the construction described, the lithographic plate 40 is alternately dampened and inked, the speed of the oscillating levers 63 being so calculated as to supply the proper amount of moisture and ink to said plate.

The mechanism hereinabove described with relation to roller 16 and blanket 39 is in all details duplicated for roller 15 and blanket 23, the same reference characters having been applied to the parts operating in conjunction with roller 15 as those applied to the parts coöperating with roller 16.

Figure 1:
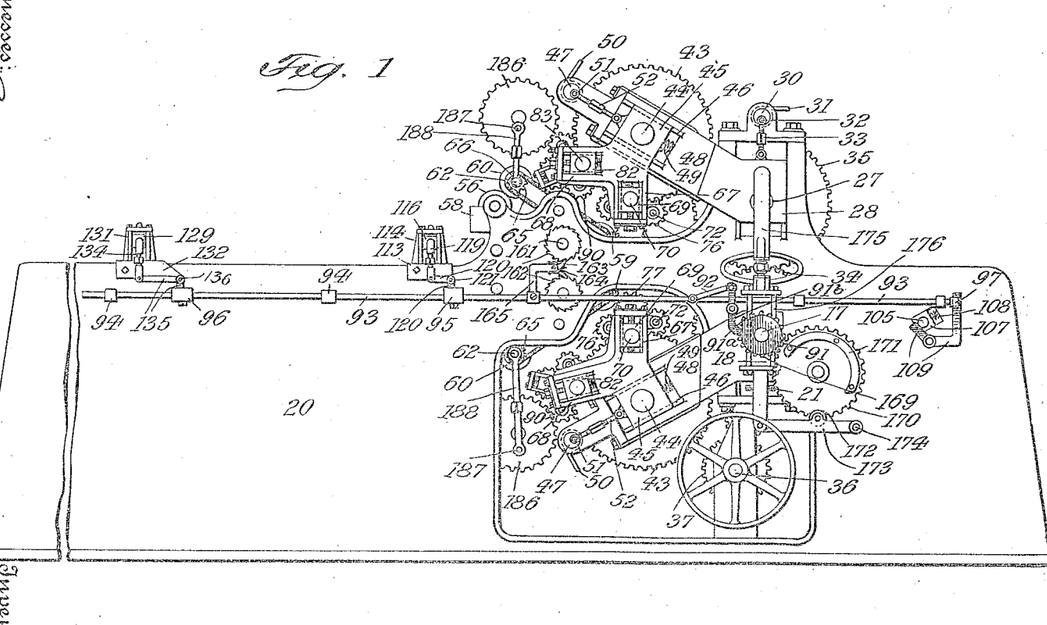

As above mentioned, our novel printing press is more particularly designed for producing sheet music, the construction being such that the printing is effected upon the end portion of a continuous web, said printed portion being subsequently severed from said web and folded into the final shape desired. In order to simplify as much as possible the means for performing the above operations the construction is such that not only the device which intermittently feeds the web to the printing rollers, but also the web-cutting and sheet-folding means are actuated by a single mechanism. For this purpose, there is secured to the shaft 17 of roller 15 at each side of the machine, a cam disk 91 the nose 91$^a$ of which is adapted to be engaged by one arm of a two arm lever 91$^b$ the other arm of which is, by link 92, connected to a slide rod 93, mounted in suitable bearings 94 of frame 20. To rod 93 are adjustably secured a pair of tappets 95, 96 which actuate the web-cutting means and sheet-folding means respectively, while to the right hand end of said rod (Fig. 1) a fork 97 is attached which actuates the web-feeding means in such a manner that the web comes to a temporary standstill, while the cutting operation is performed, said standstill in turn taking place, while the grooves 25 of rollers 15, 16 pass by one another.

The web-feeding means comprise essentially a pair of feed drums 98, 99 between which passes the web 100 supplied by reel 101. The shaft 102 of drum 98 is mounted in frame 20 and carries gear wheels 103 which are intergeared with toothed wheels 34 by wheels 104. The shaft 105 of drum 99 carrying gear wheels 106 that mesh into gear wheels 103, is mounted in slide blocks 107 which are guided in corresponding ways of frame 20, springs 108 forcing drum 99 against drum 98. Shaft 105 is engaged at each side of the machine by one arm of a two arm lever 109, the other angular arm of which is engaged by the fork 97 of rod 93. It will be seen that whenever the nose 91$^a$ of disk 91 engages lever 91$^b$, rod 93 will be shifted toward the right (Fig. 1), whereby lever 109 moves drum 99 away from drum 98 to stop the feed of web 100.

Figure 7:
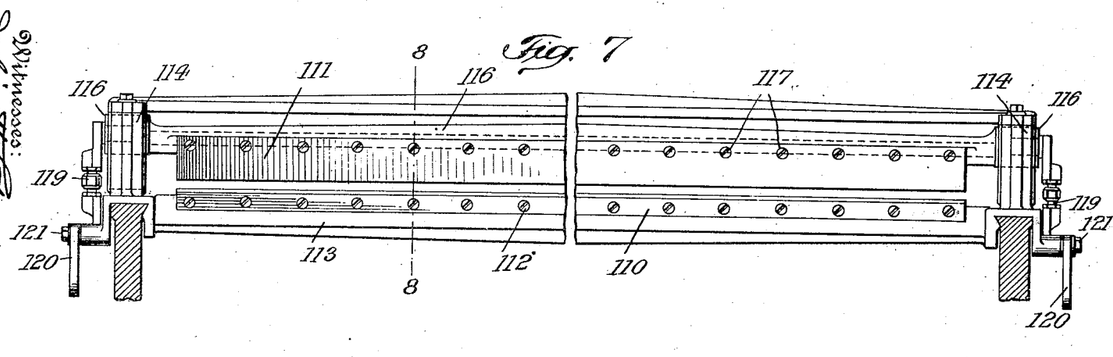
Figure 8:
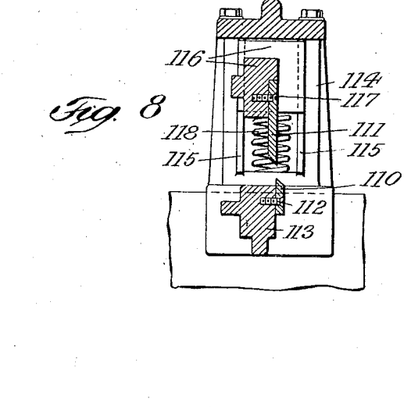
Figure 9:
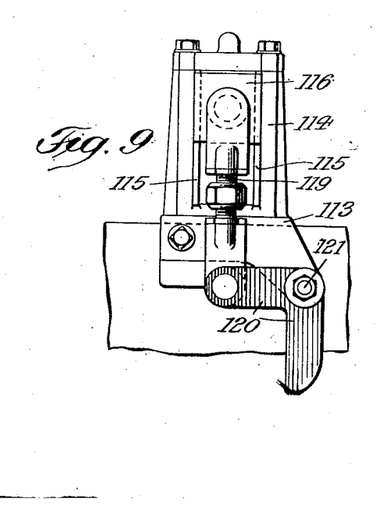

The web-cutting device comprises essentially a stationary cutting blade 110 and a movable cutting blade 111. The former is, by means of screws 112 secured to a traverse 113 that connects both sections of the machine frame 20. From the ends of traverse 113 extend upwardly standards 114 provided with guide ways 115 for the accommodation of a common slide 116 to which the movable blade 111 is secured by screws 117, slide 116 being normally raised by springs 118. To each end of slide 116 is fulcrumed an adjustable link 119 which is in turn pivoted to an elbow lever 120 turning on a fulcrum 121 of traverse 113, elbow lever 120 being adapted to be engaged by tappet 95.

The printed web is conducted toward the cutting device by means of a pair of guides 122 and a pair of feed rollers 123 that engage but the unprinted margin of the web 100, so as to prevent blurring of the fresh print. The lower roller 123 is provided with a sprocket 124 which is engaged by an endless chain 125 running over sprocket wheels 126, one of which is driven from gear wheel 34 through pinion 127.

Figures 10, 11, 12, 13:
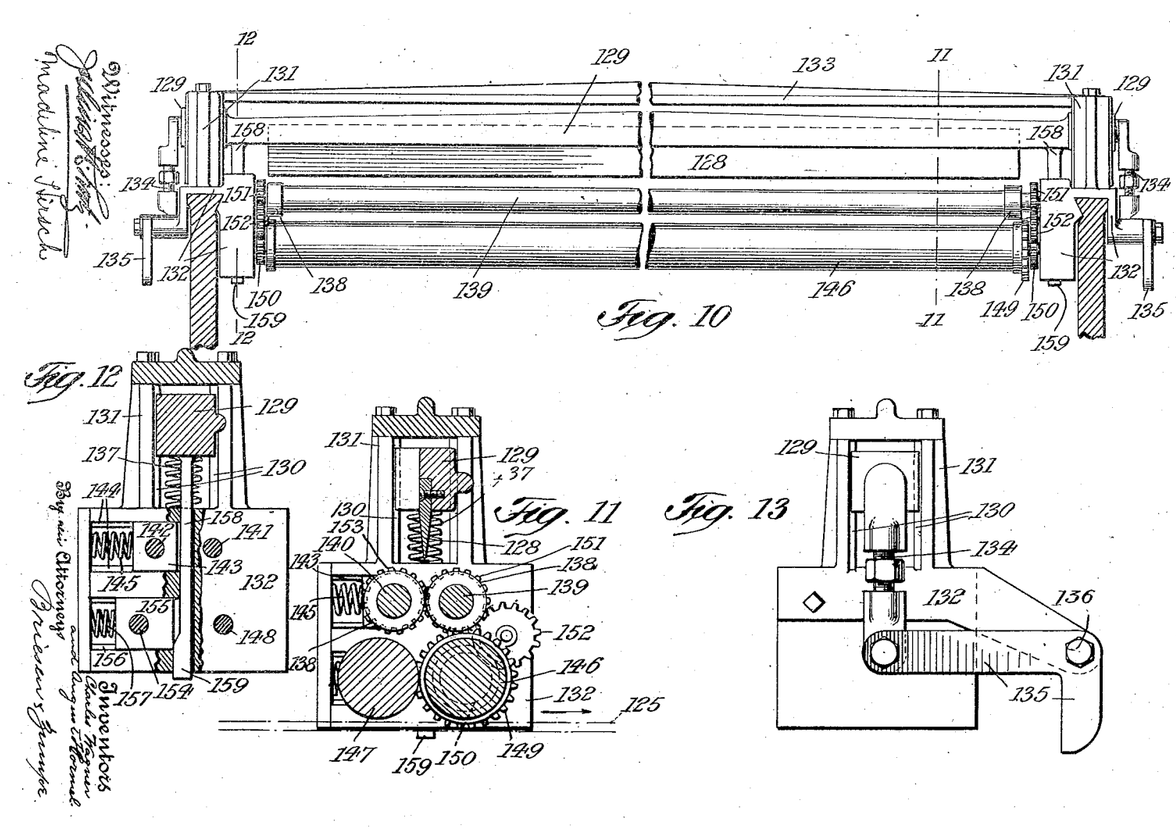

The sheet-folding device comprises essentially a vertically reciprocative folding member or blade 128 that is adapted to descend whenever the middle of the sheet to be folded has arrived underneath the same. Blade 128 is secured to a slide 129 movable along suitable guide ways 130 of standards 131 that extend upward from brackets 132 secured to the machine frame, the standards 131 being shown to be mutually connected by a bar 133. To each end of slide 129 is pivoted an adjustable link 134 which is in turn connected to one arm of an elbow lever 135 pivoted at 136 to bracket 132, the other arm of lever 135 being adapted to be engaged by tappet 96. Slide 129 is normally raised by a pair of springs 137 interposed between said slide and brackets 132. During the descent of blade 128, the sheet rests with its unprinted margin upon the collars 138 of a pair of intake rollers 139, 140. The gudgeons 141 of roller 139 are mounted in corresponding bores of brackets 132, while the gudgeons 142 of roller 140 are journaled in bearing blocks 143 engaging suitable ways 144 of said brackets, springs 145 tending to yieldingly force roller 140 against roller 139. After the sheet has thus been introduced by blade 128 between rollers 139, 140, the doubled sheet is advanced toward a pair of folding rollers 146, 147 that engage the entire width of the sheet in contradistinction to rollers 139, 140 which engage but the unprinted lateral margin of said sheet. Rollers 146, 147 are only temporarily forced toward each other in order to fix the fold of the doubled sheet, after which operation said rollers are automatically spread apart so as to prevent a blurring of the fresh print (Fig. 11). In order to obtain this desirable result, the gudgeons 148 of roller 146 are journaled in corresponding bores of brackets 132, one of said gudgeons carrying a sprocket wheel 149 which is in permanent engagement with chain 125. Shaft 148 carries further a pair of gear wheels 150 which transmit motion to gear wheels 151 of gudgeons 141 through toothed idlers 152, the gear wheels 151 meshing into similar wheels 153 fast on gudgeons 142.

Figure 2:
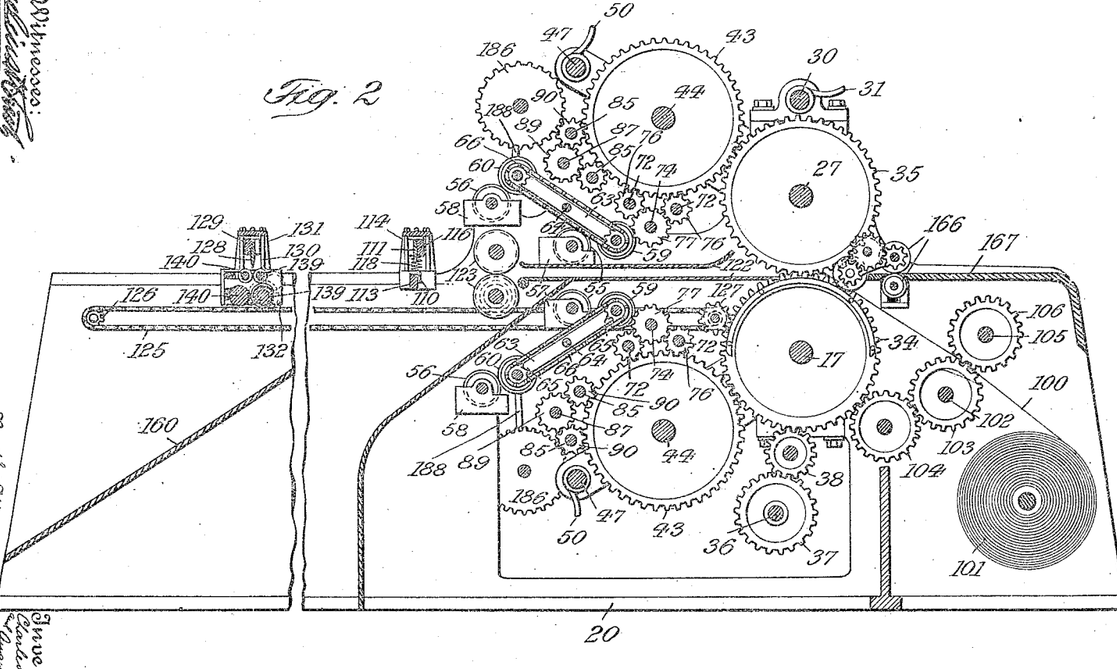
Figure 3:
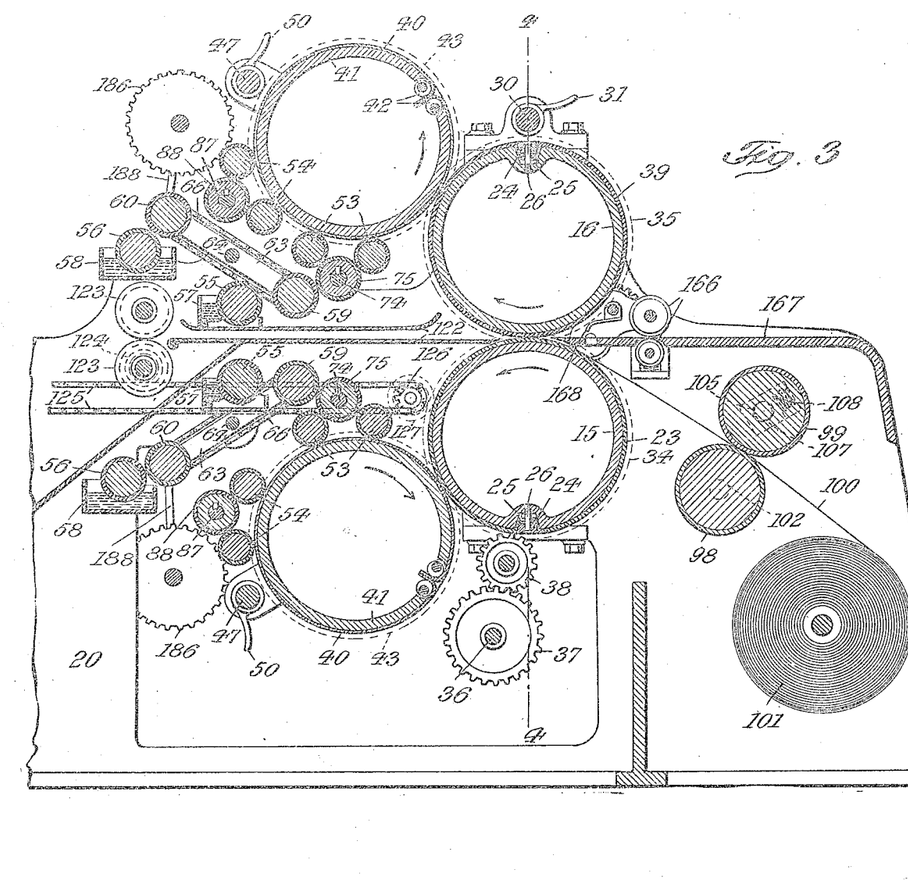
Figure 4:
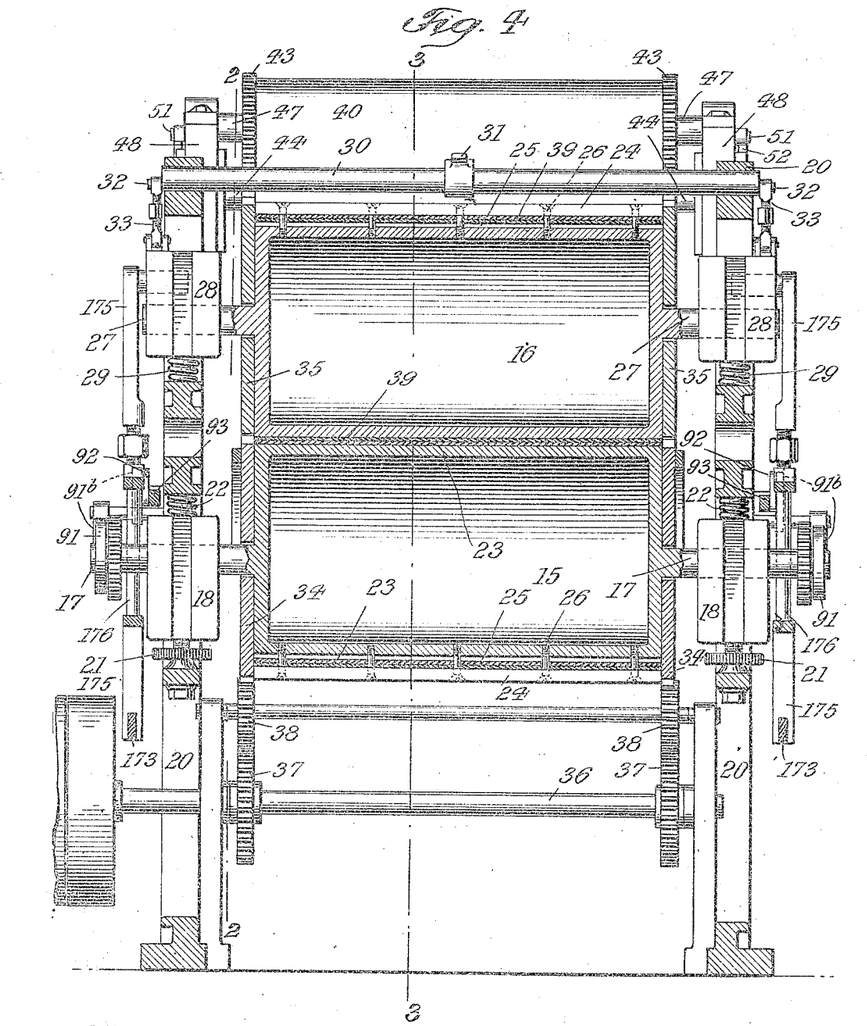

The gudgeons 154 of roller 147 are journaled in slide blocks 155, each of which is movable along guide ways 156 of brackets 132, springs 157 tending to force roller 147 against roller 146. Roller 147 is normally held away from roller 146 by suitable means, which are shown to consist of a pair of plungers 158 depending from slide 129 and engaging corresponding apertures of brackets 132. Each plunger 158 is provided at its lower extremity with an enlarged beveled portion 159 which is adapted to engage block 155 (Fig. 12) and thus move roller 147 away from roller 146 (Fig. 11) against the action of springs 157. It will thus be seen that whenever rod 93 is shifted toward the right (Fig. 1) blade 128 will be lowered to insert the printed and severed sheet along its transverse middle line between intake rollers 139, 140 to be immediately conveyed by them to the fold fixing rollers 146, 147 which are now in contact with each other owing to the lowered position of blade 128 and of the beveled feet 159 of plungers 158. The movement of rods 93 is so timed that as soon as the sheet fold has been properly fixed, levers 91$^b$ slip off noses 91$^a$ to permit the several springs 118, 137 to return said rods 93 to their original position, whereby plungers 158 are raised to spread rollers 146, 147. The printed and folded sheets are finally delivered upon a suitable chute 160 illustrated in Fig. 2.

Besides the functions above explained one of the rods 93 fulfils the additional purpose of intermittently rotating the ink supply rollers 55. The axles 161 of rollers 55 carry ratchet wheels 162 that are engaged by spring-influenced pawls 163 fulcrumed at 164 to an arm 165 of said rod. In this way the roller 55 is intermittently rotated to consecutively take up fresh supplies of ink to be presented to the ink transfer roller 59.

Although our improved printing press is more particularly designed for simultaneously printing on both sides of a continuous web, which latter, is subsequently subdivided into single sheets, the press may also be employed for printing cut sheets. In this case, the sheet is advanced by a pair of feed rollers 166 that coöperate with a suitable table 167 on which the sheet is placed until it abuts against a movable stop 168.

The parts 166, 167, 168 and their operative mechanism do not form part of the present invention, they being fully described in a co-pending patent application filed by us on Jan. 15, 1914, under Serial Number 812,172.

When the machine is used for sheet-printing, the imprints on both sides of said sheet are produced during each second revolution of the blanketed rollers 15, 16, while during the intermediate revolutions the upper roller 16 is automatically raised off the lower roller 15. For this purpose, there is secured to the shaft 17 near each end thereof, a toothed wheel 169 which meshes into a similar wheel 170 of twice the diameter of wheel 169. Wheel 170 carries a semi-circular cam 171 which is adapted to be engaged by a cam roller 172 of a lever 173 pivoted at 174. The free end of lever 173 is by adjustable link 175 connected to slide block 28 of roller 16, said link including a bipartie section 176 that straddles shaft 17. It will thus be seen that during each second revolution of rollers 15, 16, cam 171 will depress lever 173 to lower roller 16 against roller 15, while during the next revolution of said rollers, springs 29 are free to raise roller 16 off roller 15. It is obvious that when the machine is used for web-printing, the mechanism for intermittently raising roller 16 is rendered inoperative, for instance by removing lever 173, while when the machine is employed for sheet-printing, rods 93 are rendered inoperative by removing for instance levers 91$^b$ as will be readily understood.

We claim:

1. A lithographic press comprising a pair of opposed blanketed printing rollers, means for feeding a paper web between said rollers, thereby producing an imprint on each side of said web, means for cutting the printed portion off said web to form a sheet, means for folding said sheet, a reciprocating member, first means operated by said member for arresting the web-feeding means, second means operated by the member for actuating the web-cutting means, and third means also operated by said member for actuating the sheet-folding means.

2. A lithographic press comprising a pair of inter-geared opposed blanketed printing rollers, means for driving one of said rollers, means for feeding a paper web between said rollers, thereby producing an imprint on each side of said web, means for cutting the printed portion off said web to form a sheet, means for folding said sheet, a cam rotating in unison with the printing rollers, a rod adapted to be reciprocated by said cam, first means operated by said rod for arresting the web-feeding means, second means operated by the rod for actuating the web-cutting means, and third means also operated by said rod for actuating the sheet-folding means.

3. A lithographic press comprising a pair of opposed blanketed printing rollers, pattern rollers engaging the printing rollers, moisture transfer rollers and ink transfer rollers for respectively applying moisture and ink to the pattern rollers, moisture supply rollers and ink supply rollers adapted to be alternately engaged by said moisture and ink transfer rollers, means for feeding a paper web between the printing rollers, thereby producing an imprint on each side thereof, means for cutting the printed portion off said web to form a sheet, means for folding said sheet, and common means for arresting the web-feeding means, for intermittently advancing the ink supply rollers and for actuating the web-cutting means and the sheet-folding means.

4. A lithographic press comprising a pair of opposed blanketed printing rollers, pattern rollers engaging the printing rollers, means for applying moisture and ink to the pattern rollers, means for feeding a paper web between the printing rollers, thereby producing an imprint on each side of said web, means for cutting the printed portion off said web to form a sheet, means for folding said sheet, a cam rotating in unison with the printing rollers, a rod adapted to be reciprocated by said cam and adapted to arrest the web-feeding means, a first tappet on said rod adapted to actuate the web-cutting means, and a second tappet on said rod adapted to actuate the sheet-folding means.

5. A lithographic press comprising a pair of opposed blanketed printing rollers, pattern rollers engaging the printing rollers, means for applying moisture and ink to the pattern rollers, means for feeding a paper web between the printing rollers, thereby producing an imprint on each side of said web, said feeding means comprising a relatively stationary feed drum and a spring-influenced movable feed drum, means for cutting the printed portion off the web to form a sheet, means for folding said sheet, a cam secured to one of the printing rollers, a rod reciprocated by said cam, a two-arm lever operated by the rod and engaging the movable drum, a first adjustable tappet on the rod adapted to actuate the web-cutting means, and a second adjustable tappet adapted to actuate the sheet-folding means.

6. A lithographic press comprising a pair of opposed blanketed printing rollers, means for feeding a paper web between said rollers, thereby producing an imprint on each side of said web, means for cutting the printed portion off said web to form a sheet, means for folding said sheet, a cam secured to one of the printing rollers, a lever engaging said cam, a rod, a link connecting said lever and rod, means operated by the rod for arresting the web-feeding means, a first tappet on the rod adapted to actuate the web-cutting means, and a second tappet on the rod adapted to actuate the sheet-folding means.

7. In a lithographic press, a printing roller, a pattern roller engaging the same, a pair of dampening rollers and a pair of inking rollers engaging the pattern roller, a moisture distributing roller engaging the dampening rollers, an ink distributing roller engaging the inking rollers, a moisture transfer roller adapted to engage the moisture distributing roller, an ink transfer roller adapted to engage the ink distributing roller, a lever supporting said transfer rollers, and means for oscillating said lever.

8. In a lithographic press, a printing roller, a pattern roller engaging the same, a pair of dampening rollers and a pair of inking rollers engaging the pattern roller, a moisture distributing roller engaging the dampening rollers, an ink distributing roller engaging the inking rollers, a moisture transfer roller adapted to engage the moisture distributing roller, an ink transfer roller adapted to engage the ink distributing roller, a lever supporting said transfer rollers, a driving chain for operatively connecting the transfer rollers, a disk intergeared with the pattern roller, a wrist pin on said disk, and a link connecting said pin and lever.

9. In a printing press, a frame, a spring-influenced adjustable first block slidable in said frame, a printing roller journaled in said block, an arm extending laterally from said block, a spring-influenced adjustable second block slidable along said arm, and a pattern roller journaled in said second block.

10. In a printing press, a frame, a spring-influenced adjustable first block slidable in said frame, a printing roller journaled in said block, an arm extending laterally from said block, a spring-influenced adjustable second block slidable along said arm, a pattern roller journaled in said second block, a Y-shaped extension on said second block, and dampening rollers and inking rollers supported by said extension.

11. In a printing press, a frame, a spring-influenced adjustable first block slidable in said frame, a printing roller journaled in said block, an arm extending laterally from said block, a spring-influenced adjustable second block slidable along said arm, a pattern roller journaled in said second block, a Y-shaped extension on said second block, a spring-influenced adjustable third block slidable along one shank of said extension, a first bearing plate journaled in said third block, dampening rollers journaled in said first bearing plate, a spring-influenced adjustable fourth block slidable along the other shank of the Y-shaped extension, a second bearing plate journaled in said fourth block, and inking rollers journaled in said second bearing plate.

12. In a lithographic press, means for simultaneously producing an imprint on each side of a web, means for cutting the printed portion off said web to form a sheet, a pair of intake rollers having collars that are adapted to engage the unprinted margin of said sheet, a folding blade adapted to introduce the sheet between said intake rollers, and fold-fixing rollers adapted to receive the folded sheet from the intake rollers.

13. In a lithographic press, means for simultaneously producing an imprint on each side of a web, means for cutting the printed portion off said web to form a sheet, a pair of intake rollers having collars that are adapted to engage the unprinted margin of said sheet, a folding blade adapted to introduce the sheet between said intake rollers, a relatively stationary fold-fixing roller, a movable fold-fixing roller, a spring tending to force the movable roller against the stationary roller thereby fixing the fold, and means for subsequently retracting the movable fold-fixing roller from the stationary fold-fixing roller.

14. In a lithographic press, means for simultaneously producing an imprint on each side of a web, means for cutting the printed portion off said web to form a sheet, a pair of intake rollers having collars that are adapted to engage the unprinted margin of said sheet, a reciprocating slide, a folding blade depending from the slide and adapted to introduce the sheet between said intake rollers, fold-fixing rollers adapted to receive the folded sheet from the intake rollers, and means coöperating with the slide for spreading the fold-fixing rollers.

CHARLES WAGNER.
AUGUST HORMEL.

Witnesses:
ARTHUR E. ZUMPE,
MARGA L. GRÜNBERG.